United States Patent [19]
Calame et al.

[11] 3,907,896
[45] Sept. 23, 1975

[54] PROCESS FOR PREPARATION OF CYCLOPENTENONES

[75] Inventors: Jean-Pierre Calame, Fallanden; Heinrich Kappeler, Wurenlos; Peter Oberhansli, Zurich, all of Switzerland

[73] Assignee: Givaudan Corporation, Clifton, N.J.

[22] Filed: Apr. 5, 1973

[21] Appl. No.: 348,443

[30] Foreign Application Priority Data
Apr. 7, 1972 Switzerland............... 5134/72

[52] U.S. Cl.............................. 260/586 C
[51] Int. Cl.² ............... C07C 45/00; C07B 5/00
[58] Field of Search .................... 260/586 R

[56] References Cited
UNITED STATES PATENTS
2,387,587  10/1945  Hunsdiecker ............. 260/586 R
3,591,643  7/1971  Fanta et al. ............. 260/586 R X OTHER PUBLICATIONS
Acheson et al., "J. Chem. Soc.," Vol. 1952, p. 1131 (1952).

*Primary Examiner*—Bernard Helfin
*Assistant Examiner*—Norman Morgenstern
*Attorney, Agent, or Firm*—Thomas Cifelli, Jr.

[57] ABSTRACT

3-Methyl-2-cyclopenten-1-one and 2-hydroxy-3-methyl-2-cyclopenten-1-one are made by a novel process.

4 Claims, No Drawings

PROCESS FOR PREPARATION OF CYCLOPENTENONES

FIELD OF THE INVENTION

This invention relates to the field of fragrances.

SUMMARY OF THE INVENTION

The cyclopentenones involved in this invention may be represented by the following structural formula:

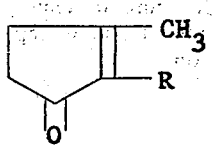

where R is hydrogen or hydroxyl.

According to the present invention, 3-methyl-2-cyclopenten-1-one, i.e., where R is hydrogen, is manufactured by adding acetonylacetone to a boiling aqueous alkali hydroxide solution, azeotropically distilling off with water the 3-methyl-2-cyclopenten-1-one formed and, if desired, separating same from the distillate.

The compound where R is OH is prepared by the conversion of 3-methyl-2-cyclopenten-1-one into 2-hydroxy-2-cyclopenten-1-one, which is a known odorant and aroma substance. This conversion comprises epoxidising the 3-methyl-2-cyclopenten-1-one and cleaving the resulting epoxide by means of aqueous acetone in the presence of a mineral acid, especially perchloric acid.

DESCRIPTION OF THE PREFERRED EMBODIMENTS

As aforesaid, according to the present invention, 3-methyl-2-cyclopenten-1-one is manufactured by adding acetonylacetone to a boiling aqueous alkali hydroxide solution, azeotropically distilling off with water the 3-methyl-2-cyclopenten-1-one formed and, if desired, separating same from the distillate.

Several processes for the manufacture of 3-methyl-2-cyclopenten-1-one are already known, one such process comprising the cyclisation of acetonylacetone with aqueous alkali (J. Chem. Soc. 1952, 1127). However, the known processes are unsatisfactory, especially with regard to their yield. Attempts to improve the process described in the foregoing literature reference have hitherto been unsuccessful (Bull. Soc. Chim. France 1963, 1286).

The process provided by the present invention affords considerably higher yields than the known processes and is also technically advantageous in that it can be carried out in a continuous manner.

As the alkali hydroxide solution there is preferably used a 0.1-N to 0.5-N sodium hydroxide solution. In order to achieve a high yield it is advantageous to use a ratio of acetonylacetone to aqueous alkali hydroxide solution of 1:10 to 1:20. The 3-methyl-2-cyclopenten-1-one can be separated from the distillate by extraction (e.g. with ethylene chloride).

As mentioned earlier, the invention is also concerned with the conversion of the 3-methyl-2-cyclopenten-1-one thus obtained into 2-hydroxy-2-methyl-2-cyclopenten-1-one which is a known odorant and aroma substance. This conversion comprises epoxidising the 3-methyl-2-cyclopenten-1-one obtained and cleaving the resulting epoxide by means of aqueous acetone in the presence of a mineral acid, especially perchloric acid.

The epoxidation is expediently carried out using an alkaline hydroperoxide solution. In contrast to other methods of epoxide cleavage, the cleavage of the epoxy group of the 2,3-epoxy-3-methylcyclopentan-1-one epoxidation product in aqueous acetone has the advantage that the reaction mixture can be worked-up in a simple manner to give a pure product since the acetone (together with some water and starting material which may be present) can be distilled off from the reaction mixture, whereupon the 2-hydroxy-3-methyl-2-cyclopenten-1-one remaining in the aqueous residue readily crystallises.

The following Examples illustrate the present invention:

EXAMPLE 1

A solution of 32 g of sodium hydroxide in 2 liters of water is heated until distillation commences. A solution of 661 g of acetonylacetone in 10 liters of water is then added slowly with simultaneous distillation of the solution, the rate of inflow being adjusted to the rate of distillation. The mean reaction time should amount to at least 80 minutes. After all the acetonylacetone solution has been added, 3 liters of water are added in the same manner. The distillation is continued until the volume of the solution amounts to about 500 ml. There are obtained about 15 liters of distillate which contains, as shown by ultraviolet analysis, 21.7 g of 3-methyl-2-cyclopenten-1-one per liter. The distillate is treated, with stirring, with 5 kg of sodium chloride and then with 2 liters of ethylene chloride. The organic layer is separated off and the aqueous solution extracted twice with 2 liters of ethylene chloride each time. The organic extracts are combined and distilled under atmospheric pressure. 400–470 g of crude 3-methyl-2-cyclopenten-1-one are obtained.

EXAMPLE 2

The 3-methyl-2-cyclopenten-1-one obtained as described in Example 1 is treated with 1100 ml of water, 12.5 g of disodium hydrogen phosphate dihydrate, 0.36 g of sodium dihydrogen phosphate monohydrate and 550 ml of 35% hydrogen peroxide. The solution is cooled to 10°–15°C and treated, with stirring, with 145 ml of 6-N sodium hydroxide solution, the temperature being maintained at between 15°C and 30°C. The mixture is thereafter stirred for a further 1 hour at room temperature. The mixture is then extracted with 500 ml of ethylene chloride. After separating off the organic phase, the aqueous solution is extracted four times with 500 ml of ethylene chloride each time. The combined organic extracts are washed with 300 ml of water. The solvent is evaporated off under reduced pressure and the oily residue distilled. 250–260 g of 2,3-epoxy-3-methylcyclopentan-1-one distil off at 63°–64°C/15 Torr.

EXAMPLE 3

260 g of the epoxide prepared as described in Example 2, 780 ml of acetone, 13 ml of 70% perchloric acid and 260 ml of water are heated with stirring. The acetone is slowly distilled off. When 520 ml of distillate have been distilled off, a solution of 6.05 g of sodium hydroxide in 100 ml of water is added. The distillation is then continued under 15 Torr. After all the acetone has been removed, a further 15 ml of water are distilled off. The residue is thereafter left to cool and crystallise. The crystals are washed with 75 ml of ice-water and dried at 40°C. There are obtained 110 g of 2-hydroxy-3-methyl-2-cyclopenten-1-one of melting point 103°–104°C. After working up the mother-liquors, there is obtained a total yield of 216 g. Recrystallisation from water affords 175 g of product of melting point 105°–106°C.

What is claimed is:

1. A process for the manufacture of 3-methyl-2-cyclopenten-1-one, which process comprises adding acetonylacetone to a boiling aqueous alkali hydroxide solution at a rate of inflow adjusted to the rate of distillation, and azeotropically distilling off with water the 3-methyl-2-cyclopenten-1-one as it is formed.

2. A process according to claim 1, wherein there is used a ratio of acetonylacetone to aqueous alkali hydroxide solution of 1:10 to 1:20.

3. A process according to claim 1, wherein 0.1-N to 0.5-N aqueous sodium hydroxide is used as the aqueous alkali hydroxide.

4. A process according to claim 1, wherein the 3-methyl-2-cyclopenten-1-one is separated from the distillate by extraction.

* * * * *

UNITED STATES PATENT OFFICE
CERTIFICATE OF CORRECTION

Patent No. 3,907,896                Dated September 23, 1975

Inventor(s) Jean-Pierre Calame, et al.

It is certified that error appears in the above-identified patent and that said Letters Patent are hereby corrected as shown below:

Column 1, lines 27 and 28, "2-hydroxy-2-cyclopenten-1-one"

should read --2-hydroxy-3-methyl-2-cyclopenten-1-one--.

Column 1, lines 65 and 66, "2-hydroxy-2-methyl-2-cyclopenten-1-one"

should read --2-hydroxy-3-methyl-2-cyclopenten-1-one--.

Signed and Sealed this twenty-fifth Day of May 1976

[SEAL]

Attest:

RUTH C. MASON
*Attesting Officer*

C. MARSHALL DANN
*Commissioner of Patents and Trademarks*